United States Patent [19]

Vorlicek

[11] Patent Number: 4,725,024
[45] Date of Patent: Feb. 16, 1988

[54] METHOD FOR SPINNING UP A THREE-AXIS CONTROLLED SPACECRAFT

[75] Inventor: Preston L. Vorlicek, Memphis, Tenn.

[73] Assignee: Ford Aerospace & Communications Corporation, Detroit, Mich.

[21] Appl. No.: 798,271

[22] Filed: Nov. 15, 1985

[51] Int. Cl.$^4$ .............................................. B64G 1/24
[52] U.S. Cl. ................................ 244/164; 244/165; 244/169
[58] Field of Search .................. 244/158 R, 164, 165, 244/169; 364/459

[56] References Cited

U.S. PATENT DOCUMENTS

| | | |
|---|---|---|
| 3,158,337 | 11/1964 | Lannan . |
| 3,758,051 | 9/1973 | Williams . |
| 3,984,071 | 10/1976 | Fleming . |
| 4,326,684 | 4/1982 | Rosen . |
| 4,370,716 | 1/1983 | Amieux . |
| 4,374,579 | 2/1983 | Renner et al. . |
| 4,471,926 | 9/1984 | Steel, III . |
| 4,537,375 | 8/1985 | Chan . |

FOREIGN PATENT DOCUMENTS 2823910 12/1978 Fed. Rep. of Germany ...... 244/165

OTHER PUBLICATIONS

Defensive Publication T100,604, Crill et al., May 5, 1981.
Wie and Barba, "Quaternion Feedback for Spacecraft Large Angle Maneuvers", *Journal of Guidance, Control, and Dynamics,* vol. 8, No. 3, May–Jun. 1985, pp. 360–365.

Primary Examiner—Galen Barefoot
Attorney, Agent, or Firm—Edward J. Radlo; Keith L. Zerschling

[57] ABSTRACT

A three-axis controlled spacecraft (1), typically a satellite, is spun up about its roll axis (20) prior to firing a motor (2), i.e., a perigee kick motor, to achieve the requisite degree of angular momentum stiffness. Thrusters (21) for imparting rotation about the roll axis (20) are activated in open-loop fashion, typically at less than full duty cycle. Cross-axis torques induced by this rotational motion are compensated for by means of closed control loops for each of the pitch and yaw axes (30, 40, respectively). Each closed control loop combines a prebias torque (72) with torques (75, 74) representative of position and rate feedback information, respectively. A deadband (52) within each closed control loop can be widened during the spinup, to conserve fuel. Position feedback information (75) in each of the control loops is disabled upon saturation of the gyroscope associated with the roll axis (20).

13 Claims, 4 Drawing Figures

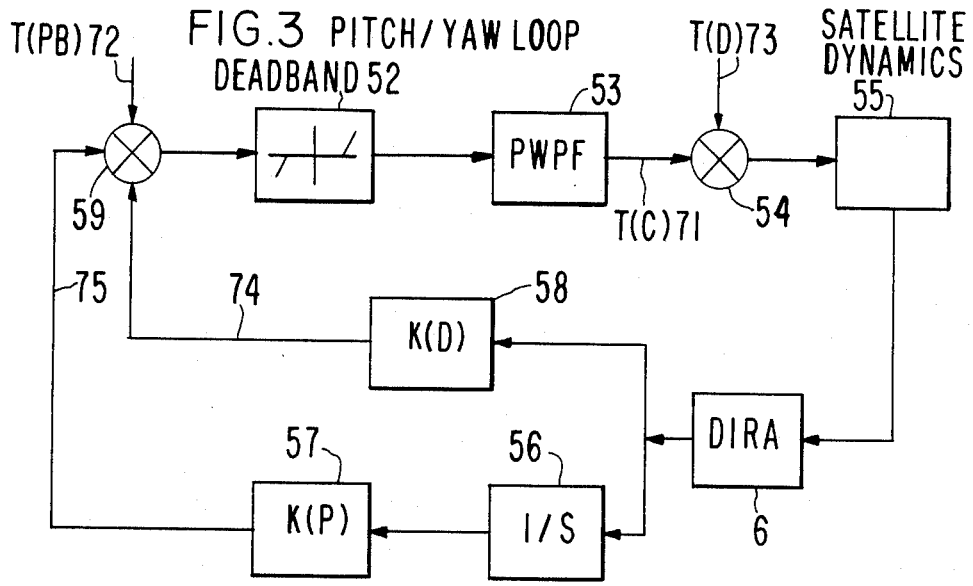
FIG.3 PITCH/YAW LOOP
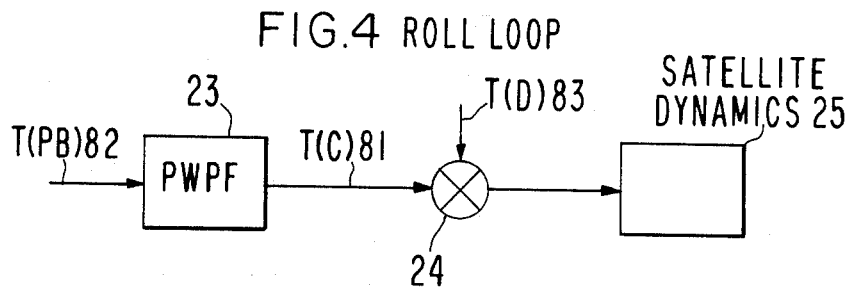
FIG.4 ROLL LOOP

METHOD FOR SPINNING UP A THREE-AXIS CONTROLLED SPACECRAFT

The invention described herein was made in the performance of work under NASA Contract No. NAS5-29500 and is subject to the provisions of Section 305 of the National Aeronautics and Space Act of 1958, as amended (72 Stat. 435; 42 U.S.C. 2457).

TECHNICAL FIELD

This invention pertains to the field of spinning up a spacecraft which is normally three-axis body stabilized. For example, a satellite which has just left the United States space transportation system (space shuttle) must often be spun up for the purposes of providing angular momentum stiffness to the satellite about an unstable axis just prior to perigee motor firing.

BACKGROUND ART

U.S. Pat. No. 4,537,375 discloses a method for introducing prebias torque into satellite thrusters during a translational change in velocity maneuver, such as that associated with stationkeeping. The present invention, on the other hand, is a method for spinning up a spacecraft that is normally three-axis body stabilized. Nutation growth is controlled while rotation is made to occur about an unstable axis. The introduction of prebias torques is but one element in the preferred embodiment of the present invention.

U.S. Pat. No. 3,758,051 discloses a method for reorienting in inertial space the spin vector of a spinning satellite using external references. The present invention, on the other hand, does not reorient the spin vector, and does not use any external references.

Secondary references are: U.S. Pat. Nos. 3,158,337, 3,984,071, 4,326,684, 4,370,716, 4,374,579, and 4,471,926; and Defensive Publication T100,604. In addition to the above references, it is noted that other prior artisans have ejected satellites from the bay of the space shuttle by using a "frisbee" ejection in an attempt to give the requisite spin prior to perigee motor firing. Still other prior artisans have used heavy and expensive spin tables within the bay of the space shuttle itself to achieve this spin.

DISCLOSURE OF INVENTION

The present invention is a method for spinning up, from a generally inertially resting position, a spacecraft (1), e.g., a satellite, about an axis which in the example illustrated in the present specification is designated as the x or roll axis (20). The spacecraft (1) is normally three-axis body stabilized about each of orthogonal roll, pitch, and yaw axes (20, 30, 40, respectively) fixed with respect to the body of the spacecraft (1).

This spinup procedure may be necessary to provide angular momentum stiffness about the roll axis (20) just prior to firing of a perigee motor (2) initially attached to the spcaecraft (1) but later jettisoned. Spin about the roll axis (20) is unstable in view of the mass distribution of the spacecraft (1) cum perigee motor (2), and energy dissipation, e.g., that due to propellant slosh. The present invention provides the requisite angular momentum stiffness by activation of means (21) for rotating the spacecraft (1) about the roll axis (20), typically at a less than 100% duty cycle. Since this rotating means (21) has been designed for the satellite (1) without the motor (2), said activation will typically induce a large amount of cross-axis torque about one or both of the other axes (30, 40).

These cross-axis torques can be compensated for by means of providing, for each of the affected cross-axes (30, 40), a torque command (71) to the rotational means (31, 41) for that cross axis (30, 40). Each torque command (71) comprises at least a rate feedback component (74) representative of the angular velocity of the spacecraft (1) about said cross-axis (30, 40). In addition, a bias component (72), based upon the amount of cross-axis torque expected to be produced by activation of the roll axis rotating means (21), is normally present. A position feedback component (75) can also be present.

BRIEF DESCRIPTION OF THE DRAWINGS

These and other more detailed and specific objects and features of the present invention are more fully disclosed in the following specification, reference being had to the accompanying drawings, in which:

FIG. 3 is a partly functional, partly symbolic block diagram of a closed control loop used by the present invention for the satellite of FIGS. 1 and 2 for each of the pitch and yaw axes 30, 40; and FIG. 4 is a open control loop used by the present invention for the satellite of FIGS. 1–3 for the roll axis 20.

BEST MODE FOR CARRYING OUT THE INVENTION

Figure 1:
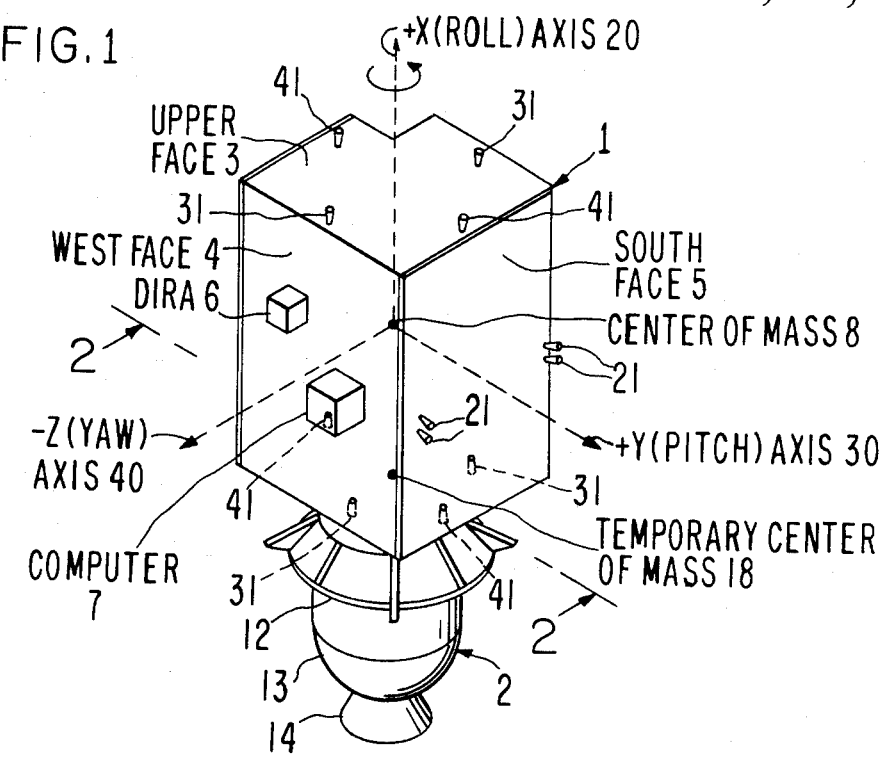
FIG. 1 is an isometric view of a satellite 1 with attached perigee motor 2 that can be advantageously spun up about its roll axis 20 by using the present invention.

The invention will be described with respect to its use on a GOES I/J/K satellite 1 that is assumed to have been just separated from the bay of a United States space shuttle (space transportation system). Satellite 1 contains a digital integrating rate assembly (DIRA) 6, which can be situated anywhere on the satellite 1, and comprises a gyroscope associated with each of the mutually orthogonal x, y, z (roll, pitch, yaw) body axes 20, 30, 40. DIRA 6 outputs, for each axis, a series of pulses (over a fixed time interval) representative of the angular velocity of satellite 1 with respect to each said axis 20, 30, 40. Onboard computer 7 counts these pulses and performs calculations to determine the angular position and angular velocity of satellite 1 with respect to each of the three axes 20, 30, 40.

When satellite 1 is about to be separated from the bay of the space shuttle, DIRA 6 is initialized to the deployment attitude. Satellite 1 is then ejected from the shuttle by a simple linear spring mechanism, avoiding the use of the frisbee approach and the heavy, expensive spin table of the prior art. Satellite 1 is allowed to pass a distance of at least 200 feet from the shuttle before any thrusters 21, 31, 41 are activated, for reasons of safety.

Satellite 1 generally comprises six faces, of which the upper face 3, west face 4, and south face 5 are shown in FIG. 1. The north, east, and lower faces are hidden from view in FIG. 1. Upper face 3 has deployed thereon a pair of yaw thrusters 41, capable of imparting positive and negative torque about yaw axis 40. A corresponding pair of yaw thrusters 41 is situated on the lower face, but is useless for initial spin-up because of the presence of large perigee solid fuel motor 2.

A pair of pitch thrusters 31 is situated on upper face 3, and is disposed to impart positive and negative torque about pitch axis 30. A corresponding pair of pitch thrusters 31 is situated on the lower face, but is useless for initial spin-up because of the presence of motor 2.

Two pairs of roll thrusters 21 are situated on south face 5. Each roll thruster 21 can impart 22 newtons (5 pounds) of force. One thruster of each pair is used for positive rotation about roll axis 20, and another of each pair is used for negative rotation about roll axis 20. Each pair is used for north-south stationkeeping maneuvers during geosynchronous orbit operations. As is typical with this category of satellite, no thrusters are present on the north face, for various reasons, such as desire to avoid interference with star sensors situated on said face.

The aforesaid set of thrusters 21, 31, 41 is capable of performing all the requisite attitude correction maneuvers to stabilize the satellite 1 about its three orthogonal body axes, 20, 30, 40, both in transfer orbit and in geosynchronous orbit, using the minimal number of thrusters 21, 31, 41.

It is necessary to spin satellite 1 with its attached motor 2 about the roll axis 20 prior to firing of motor 2 for purposes of imparting angular momentum stiffness, since roll axis 20 is coincident with the motor 2 thrust axis. Roll axis 20 is the axis of least moment of inertia. Yaw axis 40 has the most moment of inertia and is therefore the stable axis of rotation. In the absence of control torques, energy dissipation (e.g. from fuel slosh) will cause the satellite 1 to diverge into stable spin about the yaw axis 40. The purpose of the spin-up is to allow averaging of the cross axis torques introduced by motor 2 firings. The higher the spin rate, the better the averaging and pointing, and therefore the better motor 2 firing performance. On the other hand, propellant is required to spin and despin the satellite 1 and motor 2; the higher the spin rate, the more propellant is required. Other factors influencing spin rate are sensor dynamic range, nutation divergent time constant, and thrust levels of thruster 21(U). In the instant application, the spinup is performed to a rate of 40 revolutions per minute just prior to firing of said motor 2. When the roll rate reaches 40 rpm, computer 7 commands motor 2 to fire, and jet damping effects control nutation. The spinup is accomplished in 12 minutes.

One technique used by the prior art to accomplish roll axis angular momentum stiffness was to employ an additional set of thrusters in that plane normal to the roll axis and containing the temporary (combined) center of mass 18 of the combined satellite 1/motor 2, in addition to the usual roll thrusters 21 situated in that plane normal to the roll axis and containing satellite-only center of mass 8. The present invention avoids the extra cost associated with this prior art approach, inasmuch as it uses the existing three-axis thrusters 21, 31, 41, and no others.

Satellite 1/motor 2 can be reoriented in inertial space to the desired orientation for motor 2 firing by means of a conventional method such as the method involving quanternions described in the paper by Wie and Barba entitled "Quaternion Feedback for Spacecraft Large Angle Maneuvers", *Journal of Guidance, Control, and Dynamics*, Vol. 8, No. 3, May–June 1985, pp. 360–365. In this method, the satellite's instantaneous attitude is determined by means of computer 7 which has been tracking the movement of satellite 1 from the time of its separation from the space shuttle until the point where it is desired to initiate motor 2 firing. Satellite 1 is then placed in the inertial attitude it had as it was being ejected from the shuttle bay, or in a preselected relationship thereto.

Alternatively, motor 2 comprises sufficient hardware to provide computer 7 with an inertial reference.

Figure 2:
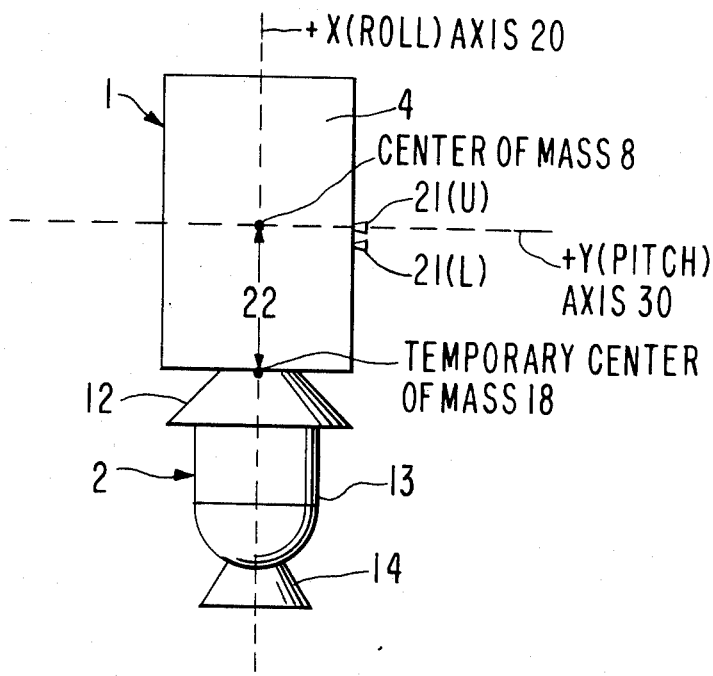
FIG. 2 is a side view of the satellite 1 of FIG. 1 viewed along view lines 2—2.

FIG. 2 shows that motor 2 comprises a coupling module 12, a propellant tank 13, and an exhaust 14. An upper pair of roll thrusters 21(U) lies in the plane normal to roll axis 20 and containing pitch axis 30 and center of mass 8. One of this upper pair of thrusters 21(U) is used to impart the spinning motion by means of an open control loop illustrated in FIG. 4.

In the general case, the activated thruster could be fired at a less than or equal to 100% duty cycle, depending upon thrust level, thruster location, and location of the center of gravity of the combined spacecraft/motor. For the GOES I/J/K satellites illustrated herein, the activated thruster 21(U) is commanded by computer 7 to fire at approximately 50% of its duty cycle; if a 100% duty cycle were used, cross-axis torques produced by thruster 21(U) would be too great to be compensated for by the cross-axis thrusters 31, 41. The 22 newton (5 pound) yaw thrusters 41 are less than totally effective in compensating for cross-axis torques because the yaw thrusters 41 are canted with respect to the roll axis 20, to account for plume impingement, disturbance torques, nominal center of gravity, etc.

On the other hand, the duty cycle of activated thruster 21(U) must be large enough to provide the requisite angular momentum stiffness for a successful firing of motor 2, during a reasonably short time period (10 to 12 minutes).

FIG. 4 shows that the torque 82 produced from thruster 21(U) passes through pulse-width pulse-frequency (PWPF) conditioner 23, to achieve fine modulation resolution. PWPF 23 outputs a command torque 81, a series of relatively rapid pulses with varying width and varying frequency. Command torque 81 is combined at symbolic summing junction 24 with whatever disturbance torques 83 are operating about the roll axis 21, affecting the satellite's rigid body attitude dynamics 25, which are symbolically represented.

FIG. 2 shows that the spin induced by roll thruster 21(U) creates a major cross-axis torque about the yaw axis 40 (which is perpendicular to the page of FIG. 2). This is because of the presence of relatively long moment arm 22, i.e., the distance between the temporary center of mass 18 of the combined satellite 1/motor 2 and the plane that is normal to roll axis 20 and contains thruster 21(U) and satellite-only center of mass 8. A small cross-axis torque is produced about pitch axis 30 by virtue of the fact that roll thruster 21(U) is canted approximately 10° with respect to pitch axis 30, to avoid plume impingement effects on solar arrays deployed in the vicinity of south face 5.

These cross-axis torques expected to be produced about the pitch yaw axes 30, 40 are preferably used as part of the separate closed control loops for each of the pitch and yaw axes 30, 40. These two closed loops are functionally identical, so only one of them is illustrated in FIG. 3, which shows that a prebias torque 72 equal in magnitude and opposite in sign to the corresonding cross-axis torque produced by roll thruster 21(U) is fed by computer 7 as one input to summer 59. Prebias torque 72 could be preselected, in which case it could be sent to satellite 1 by ground command or stored in a ROM within computer 7. Alternatively, prebias torque 72 could be estimated in real time using an on-board filter. Torque 72 could even be omitted from the closed loops altogether; however, this would cause degraded performance because of the necessity to burn additional fuel.

Summer 59 outputs a torque command that passes through deadband circuit 52 and PWPF 53. Deadband 52 filters out small levels of noise, and filters out acceptable small motions of the satellite 1. For example, if the satellite's rigid body nutation is ±0.1°, and this performance is acceptable, then the deadbands would be set greater than ±0.1°, to prevent thruster 31, 41 firing (or activation of actuators other than thrusters) during acceptable movements of the satellite 1.

In FIG. 3, the input to deadband 52 is illustrated along the horizontal axis, and the output from deadband 52 is illustrated along the vertical axis. Approximately halfway through the spinup procedure, which typically takes about twelve minutes, each deadband is preferably widened by command from computer 7, to save fuel. I.e., that portion of the deadband's transfer function lying along the horizontal axis is lengthened. This opening of deadbands 52 prevents the thrusters 31, 41 from firing during the rigid body nutation of satellite 1, while still allowing the thrusters 31, 41 to control nutation divergence. Halfway through spinup, nutation is more acceptable, because the averaging of disturbance torques is better at higher spin rates.

Prebias 72 can also be removed at the time of opening up of the deadbands 52, or at some other time during the spinup procedure.

The output of deadband 52 is conditioned by PWPF 53, which has a quasi-linear transfer function and permits finer resolution of thruster commands. The output of PWPF 53 is command torque 71, which, after being combined by symbolic combiner 54 with whatever disturbance torques 73 are acting with respect to that axis, affects the satellite's attitude dynamics 55.

The actual angular velocity about the given cross-axis 30, 40 is measured by DIRA 6, which outputs a measured angular velocity that passes through two feedback branches, each of which is combined at summer 59 with the prebias torque 72. The upper feedback branch 74 provides rate (angular velocity) feedback, and employs conditioning by means of a rate gain constant 58. In the lower feedback branch, the angular velocity is converted into position information 75 by means of integrator 56 and position gain control constant 57. Constants 58 and 57 are stored in computer 7, which also performs the integration shown in block 56. The gains 58 and 57 are selected based upon the desired bandwidth and stability margin, using conventional techniques of control loop theory.

For a three-axis controlled satellite such as that illustrated herein, the gyroscope within DIRA 6 associated with roll axis 20 is typically designed so that it saturates between 2° per second and 10° per second angular velocity. This is to give fine resolution at the low angular velocities associated with three-axis maneuvers, and is a very low rate compared with the roughly 240° per second spin rate required just prior to perigee motor 2 firing for the scenario described herein. Thus, the roll gyro saturates very quickly during operation of the method of the present invention. When the roll gyro saturates, position information is lost for all three axes 20, 30, 40, but the rate information remains valid. For this reason, computer 7 is programmed to disable the position feedback branch information 75 for each of the cross-axis control loops at the moment of roll gyro saturation, by means of forcing this position torque 75 to zero, or a value close to zero to compensate for any known miscalibration of the gyro with respect to that axis 30, 40.

The above description is included to illustrate the operation of the preferred embodiments and is not meant to limit the scope of the invention. The scope of the invention is to be limited only by the following claims. From the above discussion, many variations will be apparent to one skilled in the art that would yet be encompasses by the spirit and scope of the invention.

What is claimed is:

1. A method for spinning up, and thereby adding momentum to, a combination comprising a three-axis controlled spacecraft and a detachable mass appended thereto, said spacecraft having first, second, and third means for rotation the spacecraft about each of first, second, and third mutually orthogonal spacecraft axes, respectively, said method comprising the steps of:

incorporating into the spacecraft a closed control loop for each of the second and third axes;

activating in an open-loop fashion the first rotating means to impart a spin to the combination about the first axis; and activating at least one of the closed control loops by sending a torque command to the rotating means for the axis associated with each said activated closed control loop, each said torque command comprising a rate feedback component representative of the angular velocity of the combination about said control loop axis.

2. The method of claim 1 wherein each torque command further comprises a prebias component based upon the amount of cross-axis torque about said control loop axis produced by activation of the first rotating means.

3. The method of claim 1 wherein the spacecraft is a satellite which has recently been separated from the space transportation system and the detachable appended mass is a rocket motor.

4. The method of claim 1 wherein the combination's initial position prior to execution of the two activating steps has been determined by calculating, using a quaternion based method, the history of the motion of the combination about each of the three axes following the combination's separation from a launch vehicle.

5. The method of claim 1 wherein the first rotating means is activated at less than its full duty cycle.

6. The method of claim 1 wherein each command torque is conditioned by a pulse-width pulse-frequency modulator.

7. The method of claim 1 wherein each command torque is conditioned by a deadband circuit.

8. The method of claim 7 wherein each deadband is widened after a preselected period of time during the spinup procedure, to permit conservation of fuel used to activate the rotating means.

9. The method of claim 1 wherein each torque command further comprises a position feedback component representative of the angular position of the combination about the corresponding control loop axis.

10. The method of claim 9 wherein the spacecraft further comprises a gyroscope associated with each of the three axes, for determining the relative angular position and angular velocity of the combination about each of said three axes, wherein:

the gyroscope associated with the first axis saturates during the activation of the first rotating means; and the position feedback components for each of the two closed control loops are disabled when said first axis gyroscope saturates.

11. The method of claim 1 wherein the duty cycle of the first rotating means is commanded to be sufficiently small that the calculated maximum cross-axis torques generated by the activation of the first rotating means can be compensated for by the activation of the closed control loops, with a preselected margin of safety.

12. The method of claim 1 wherein each of the first, second, and third rotating means comprises a pair of thrusters.

13. The method of claim 1 wherein the spacecraft comprises six faces, and the first rotating means is wholly situated on one of said faces.

* * * * *